United States Patent
Tung et al.

(10) Patent No.: US 11,348,319 B1
(45) Date of Patent: May 31, 2022

(54) 3D RECONSTRUCTION OF A MOVING OBJECT

(71) Applicant: Facebook Technologies, LLC, Menlo Park, CA (US)

(72) Inventors: Tony Tung, San Francisco, CA (US); Zerong Zheng, Sausalito, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/749,784

(22) Filed: Jan. 22, 2020

(51) Int. Cl.
| | | |
|---|---|---|
| *G06T 19/00* | (2011.01) | |
| *G06T 15/04* | (2011.01) | |
| *G06T 7/207* | (2017.01) | |
| *G06T 7/50* | (2017.01) | |

(52) U.S. Cl.
CPC ............ *G06T 19/006* (2013.01); *G06T 7/207* (2017.01); *G06T 7/50* (2017.01); *G06T 15/04* (2013.01); *G06T 2207/30196* (2013.01)

(58) Field of Classification Search
None
See application file for complete search history.

(56) References Cited

U.S. PATENT DOCUMENTS

| 8,209,143 B1* | 6/2012 | Anguelov | G01C 15/00 |
| | | | 702/150 |
| 2014/0206443 A1* | 7/2014 | Sharp | G06T 7/593 |
| | | | 463/31 |
| 2014/0368504 A1* | 12/2014 | Chen | G06T 17/005 |
| | | | 345/424 |
| 2015/0348316 A1* | 12/2015 | Porcino | G06T 7/40 |
| | | | 345/426 |
| 2017/0046868 A1* | 2/2017 | Chernov | H04N 13/221 |
| 2018/0108168 A1* | 4/2018 | Abe | G06T 15/04 |
| 2018/0315222 A1* | 11/2018 | Jones | G06T 15/005 |

* cited by examiner

*Primary Examiner* — Hilina K Demeter
(74) *Attorney, Agent, or Firm* — Baker Botts L.L.P.

(57) ABSTRACT

In one embodiment, a method includes reconstructing a three-dimensional shape of a target object, creating a two-dimensional normal map for the three-dimensional shape of the target object, accessing image data and depth data associated with the target object, generating a first normal data associated with the target object using the image data and the depth data, updating the normal map using the first normal data, and re-rendering the three-dimensional shape of the target object based on the updated normal map.

20 Claims, 7 Drawing Sheets

3D RECONSTRUCTION OF A MOVING OBJECT

TECHNICAL FIELD

This disclosure generally relates to 3-dimensional image processing, and in particular, related to 3-dimensional reconstructions of a moving object.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may recreate a 3-dimensional (3D) avatar of a moving human body (or any other animate object with surface deformations) using a Red Green Blue and Depth (RGB-D) camera by creating a dynamic normal map. An RGB-D camera may capture an RGB-D image at a frame, where an RGB-D image is a combination of an RGB image and its corresponding depth image. A depth image may be an image channel in which each pixel may relate to a distance between the image plane and the corresponding object in the RGB image. A method for updating a normal map based on dynamic changes in real-time may be used to capture fine deformations. First, the computing device may reconstruct the body shapes using fusion of volumetric Signed Distance Field (SDF) from monocular RGB-D sensor. Then, the computing device may create a dynamic normal map that is updated in real-time using current RGB-D observation and prior fused data. The computing device may update the normal map by minimizing an energy function of a data term and a smooth term using gradient descent in order to derive normal information over the object. The data term may measure differences between the normal on the map and the observed normal in the current RGB-D frame, and the smoothness term may ensure consistency between neighboring pixels. The surface of the object may be reconstructed based on the updated normal map. In particular, the normal map may be used like a texture of the coarse mesh that represents the avatar's body. When the avatar is being rendered, the rendering system could perform visibility tests using the mesh representation of the avatar (e.g., to determine what is visible to a pixel, a ray could be cast from that pixel to see where it intersects with the coarse mesh representation). Based on the visibility tests, the rendering system could then sample corresponding locations in the normal map and color texture map when computing the appropriate color for each pixel. When the target object moves away from the camera, the object would appear smaller. To preserve the details on the surface of the object, the computing device may utilize a pyramidal architecture of normal maps, from a most coarse level normal map to a finest level normal map. When the object moves closer to the camera, or moves away from the camera, the computing device may identify a first level that corresponds to the current distance of the object from the camera. The computing device may update the first level normal map based on current observations. Then, the computing device may also update normal maps of the other levels by projecting the changes on the first normal map onto the other normal maps. In particular embodiments, the computing device may update only the normal maps of finer resolutions than the first level. When the computing device renders the object, the highest resolution normal map may be used. When the avatar of the object is animated, the recorded normal map when the object was in the animated position may be used to render the surface of the animated avatar.

In particular embodiments, a computing device may reconstruct a three-dimensional shape of a target object. The computing device may perform a Non-rigid Signed Distance Function (SDF) fusion of a stream of image data for the target object to reconstruct the three-dimensional shape of the target object. In particular embodiments, the target object may be a human body. The computing device may create a two-dimensional normal map for the three-dimensional shape of the target object. The computing device may access image data and depth data associated with the target object. The computing device may generate a first normal data associated with the target object using the image data and the depth data. The computing device may update the normal map using the first normal data. The computing device may minimize an energy function of a data term and a smooth term using gradient descent to update the normal map. In particular embodiments, the data term may measure differences between a normal on the normal map and an observed normal in the current image data for the frame. In particular embodiments, the smooth term may be for ensuring consistency between neighboring pixels. The computing device may re-render the three-dimensional shape of the target object based on the updated normal map. The computing device may render a surface of the reconstructed three-dimensional shape of the target object based on the updated normal map to re-render the three-dimensional shape of the target object.

In particular embodiments, the computing device may render an avatar of the target object based on the reconstruction of the target object. In particular embodiments, the computing device may animate an avatar of the target object. The computing device may use the recorded normal map when the target object is in the animated position for rendering a surface of the animated avatar.

In particular embodiments, the computing device may maintain a plurality of normal maps of a plurality of resolutions. Each resolution may correspond to a distance between the target object and a camera capturing the image data and the depth data associated with the target object. The computing device may detect the target object moves from a first distance to a second distance from the camera, where the second distance may not correspond to a finest resolution among the plurality of resolutions. The computing device may determine a first resolution for the normal map corresponding to the second distance of the target object. In order to update the normal map, the computing device may generate a second normal data associated with the target object using the image data and the depth data. The computing device may update the first resolution normal map using the second normal data associated with the target object. The computing device may project the update on the first resolution normal map to other normal maps among the plurality of normal maps. In particular embodiments, the other normal maps may comprise normal maps of finer resolutions than the first resolution. The computing device may render a surface of the reconstructed three-dimensional shape based on a second resolution normal map that is a finest resolution normal map among the plurality of normal maps when the computing device re-renders the three-dimensional shape of the target object.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing device may recreate a 3-dimensional (3D) avatar of a moving human body (or any other animate object with surface deformations) using a Red Green Blue and Depth (RGB-D) camera by creating a dynamic normal map. An RGB-D camera may capture an RGB-D image at a frame, where an RGB-D image is a combination of an RGB image and its corresponding depth image. A depth image may be an image channel in which each pixel may relate to a distance between the image plane and the corresponding object in the RGB image. A method for updating a normal map based on dynamic changes in real-time may be used to capture fine deformations. First, the computing device may reconstruct the body shapes using fusion of volumetric Signed Distance Field (SDF) from monocular RGB-D sensor. Then, the computing device may create a dynamic normal map that is updated in real-time using current RGB-D observation and prior fused data. The computing device may update the normal map by minimizing an energy function of a data term and a smooth term using gradient descent in order to derive normal information over the object. The data term may measure differences between the normal on the map and the observed normal in the current RGB-D frame, and the smoothness term may ensure consistency between neighboring pixels. The surface of the object may be reconstructed based on the updated normal map. In particular, the normal map may be used like a texture of the coarse mesh that represents the avatar's body. When the avatar is being rendered, the rendering system could perform visibility tests using the mesh representation of the avatar (e.g., to determine what is visible to a pixel, a ray could be cast from that pixel to see where it intersects with the coarse mesh representation). Based on the visibility tests, the rendering system could then sample corresponding locations in the normal map and color texture map when computing the appropriate color for each pixel. When the target object moves away from the camera, the object would appear smaller. To preserve the details on the surface of the object, the computing device may utilize a pyramidal architecture of normal maps, from a most coarse level normal map to a finest level normal map. When the object moves closer to the camera, or moves away from the camera, the computing device may identify a first level that corresponds to the current distance of the object from the camera. The computing device may update the first level normal map based on current observations. Then, the computing device may also update normal maps of the other levels by projecting the changes on the first normal map onto the other normal maps. In particular embodiments, the computing device may update only the normal maps of finer resolutions than the first level. When the computing device renders the object, the highest resolution normal map may be used. When the avatar of the object is animated, the recorded normal map when the object was in the animated position may be used to render the surface of the animated avatar.

In particular embodiments, a computing device may reconstruct a three-dimensional shape of a target object. The computing device may perform a Non-rigid Signed Distance Function (SDF) fusion of a stream of image data for the target object to reconstruct the three-dimensional shape of the target object. In particular embodiments, the target object may be a human body. The computing device may create a two-dimensional normal map for the three-dimensional shape of the target object. The computing device may align a shape template to the fused observations in order to create the two-dimensional normal map. The computing device may access image data and depth data associated with the target object. The computing device may generate a first normal data associated with the target object using the image data and the depth data. The computing device may update the normal map using the first normal data. The computing device may minimize an energy function of a data term and a smooth term using gradient descent to update the normal map. In particular embodiments, the data term may measure differences between a normal on the normal map and an observed normal in the current image data for the frame. In particular embodiments, the smooth term may be for ensuring consistency between neighboring pixels. The computing device may re-render the three-dimensional shape of the target object based on the updated normal map. The computing device may render a surface of the reconstructed three-dimensional shape of the target object based on the updated normal map to re-render the three-dimensional shape of the target object.

In particular embodiments, the computing device may render an avatar of the target object based on the reconstruction of the target object. In particular embodiments, the computing device may animate an avatar of the target object. The computing device may use the recorded normal map when the target object is in the animated position for rendering a surface of the animated avatar.

In particular embodiments, the computing device may maintain a plurality of normal maps of a plurality of resolutions. Each resolution may correspond to a distance between the target object and a camera capturing the image data and the depth data associated with the target object. The computing device may detect the target object moves from a first distance to a second distance from the camera, where the second distance may not correspond to a finest resolution among the plurality of resolutions. The computing device may determine a first resolution for the normal map corresponding to the second distance of the target object. In order to update the normal map, the computing device may generate a second normal data associated with the target object using the image data and the depth data. The computing device may update the first resolution normal map using the second normal data associated with the target object. The computing device may project the update on the first resolution normal map to other normal maps among the plurality of normal maps. In particular embodiments, the other normal maps may comprise normal maps of finer resolutions than the first resolution. The computing device may render a surface of the reconstructed three-dimensional shape based on a second resolution normal map that is a finest resolution normal map among the plurality of normal maps when the computing device re-renders the three-dimensional shape of the target object.

Figure 1:
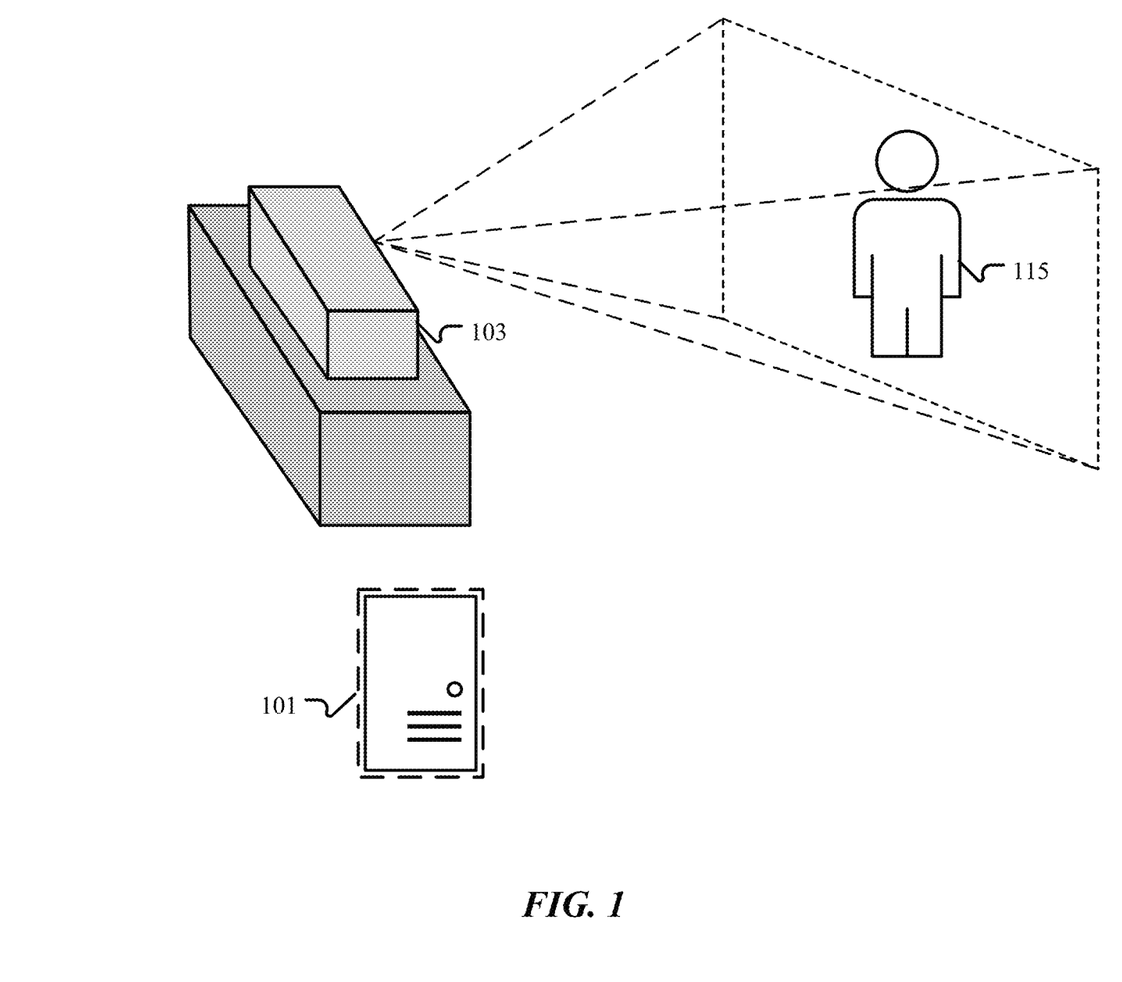
FIG. 1 illustrates an example system for capturing the stream of image data using a Red Green Blue and Depth (RGB-D) camera.

In particular embodiments, a computing device may access a stream of image data that comprises a plurality of color channels and a depth channel. The computing device may be associated with a Red Green Blue and Depth (RGB-D) camera. The stream of image data may be captured by the RGB-D camera. An image may comprise one or more objects. A pixel in the depth channel may represent a distance between an image plane and an object corresponding to the pixel in the image. FIG. 1 illustrates an example system for capturing the stream of image data using an RGB-D camera. As an example and not by way of limitation, illustrated in FIG. 1, the computing device 101 may be connected to an RGB-D camera 103 that captures a stream of image data. In particular embodiments, the computing device 101 may be connected to the RGB-D camera 103 through one or more wired connections. In particular embodiments, the computing device 101 may be connected to the RGB-D camera 103 through wireless connections. The RGB-D camera 103 may capture a moving object 115.

The target object 115 may be a human body. The stream of image data may comprise three color channels including Red, Green and Blue channels and a depth channel. The depth channel comprises information indicating a distance between the image plane and an object captured within the image. Although this disclosure describes the system for capturing a stream of RGB-D image data in a particular manner, this disclosure contemplates the system for capturing a stream of RGB-D image data in any suitable manner.

Figure 2:
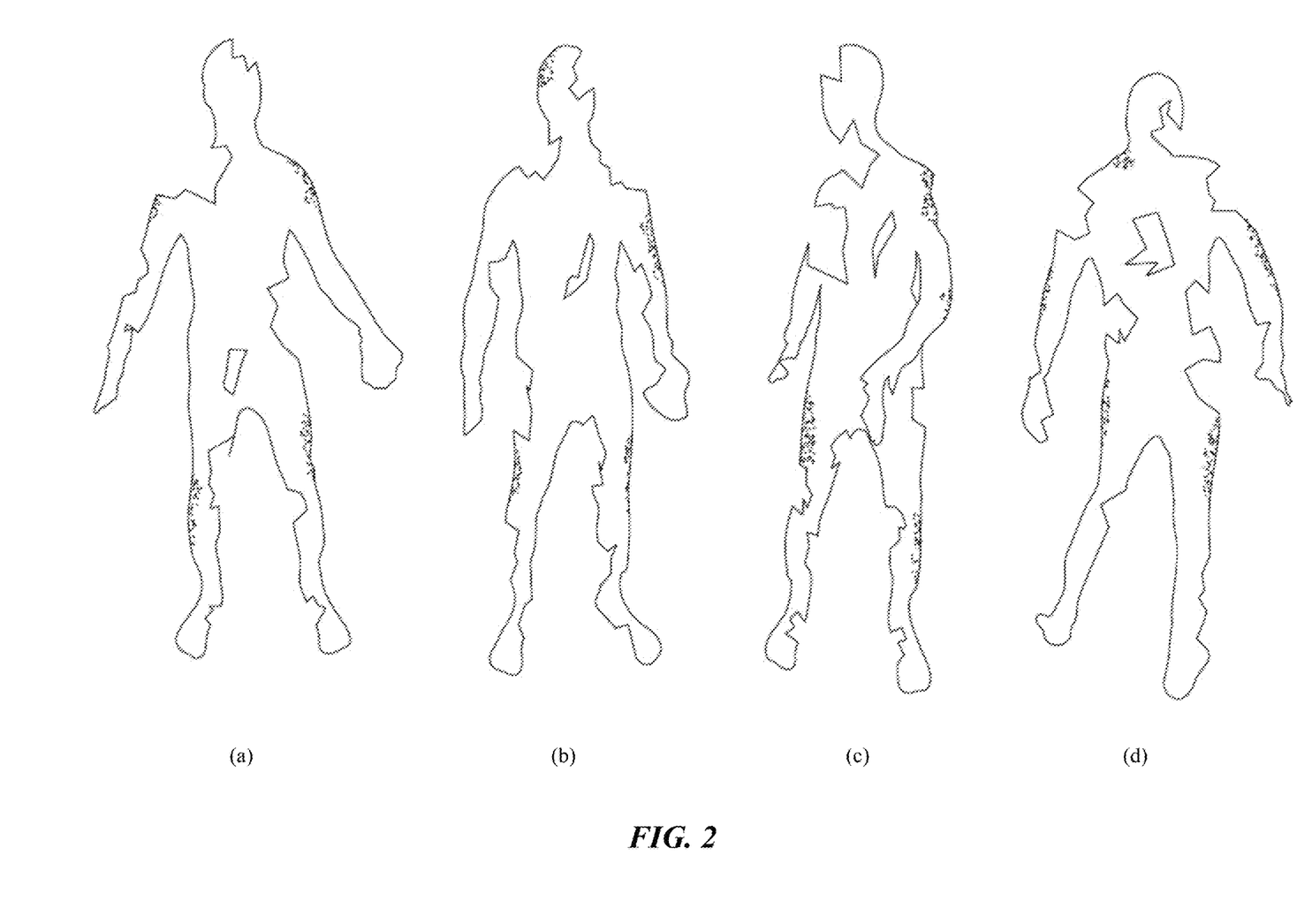
FIG. 2 illustrates example reconstructions of a target object using the Non-rigid SDF fusion.

In particular embodiments, a computing device 101 may reconstruct a three-dimensional shape of a target object 115. The computing device 101 may perform a Non-rigid Signed Distance Function (SDF) fusion of a stream of image data for the target object 115 to reconstruct the three-dimensional shape of the target object 115. In particular embodiments, the target object may be a human body. FIG. 2 illustrates example reconstructions of a target object using the Non-rigid SDF fusion. Figures (a), (b), (c) and (d) in FIG. 2 are reconstructions of a body of a person who is rotating around a point based on an SDF fusion. As illustrated in FIG. 2, the reconstructions may be noisy with one or more holes, especially when the target object is moving. Furthermore, the details of the object (e.g., hands of the human body, etc.) may not be reconstructed properly. Those are because of a limited frame rate of the RGB-D camera. Though the SDF fusion may be suitable for reconstructing coarse representations of a relatively motionless object, the SDF fusion alone may not be good enough to update smaller deformations such as ones caused by facial expressions or cloth wrinkles of a target object. To overcome these deficits of the SDF fusion, this disclosure proposes utilizing a 2-dimensional normal map. Although this disclosure describes reconstructing a shape of a target object using a fusion of the stream of image data in a particular manner, this disclosure contemplates reconstructing a shape of a target object using a fusion of the stream of image data in any suitable manner.

In particular embodiments, the computing device 101 may create a 2-dimensional normal map for the target object 115. In 3D computer graphics, a normal map may be used for faking the lighting of bumps and dents. The normal map may be used to add details without using more polygons. The normal map may be used to greatly enhance the appearance and details of a low polygon model by generating a normal map from a high polygon model or height map. A normal map may be stored as regular RGB images where the RGB components correspond to the X, Y, and Z coordinates, respectively, of the surface normal. Although this disclosure describes creating a normal map for a target object in a particular manner, this disclosure contemplates creating a normal map for a target object in any suitable manner.

In particular embodiments, the computing device 101 may access image data and depth data associated with the target object 115. The computing device 101 may generate a first normal data associated with the target object 115 using the image data and the depth data. As an example and not by way of limitation, continuing with a prior example, the computing device 101 may access image data and depth data associated with the target object 115 that is captured by the RGB-D camera 103. The computing device 101 may generate a normal data associated with the target object 115 using the accessed image data and the depth data. The normal data may be generated based on the image data and the depth data corresponding to a current frame and the prior fused data. Although this disclosure describes generating a normal data in a particular manner, this disclosure contemplates generating a normal data in any suitable manner.

Figure 3:
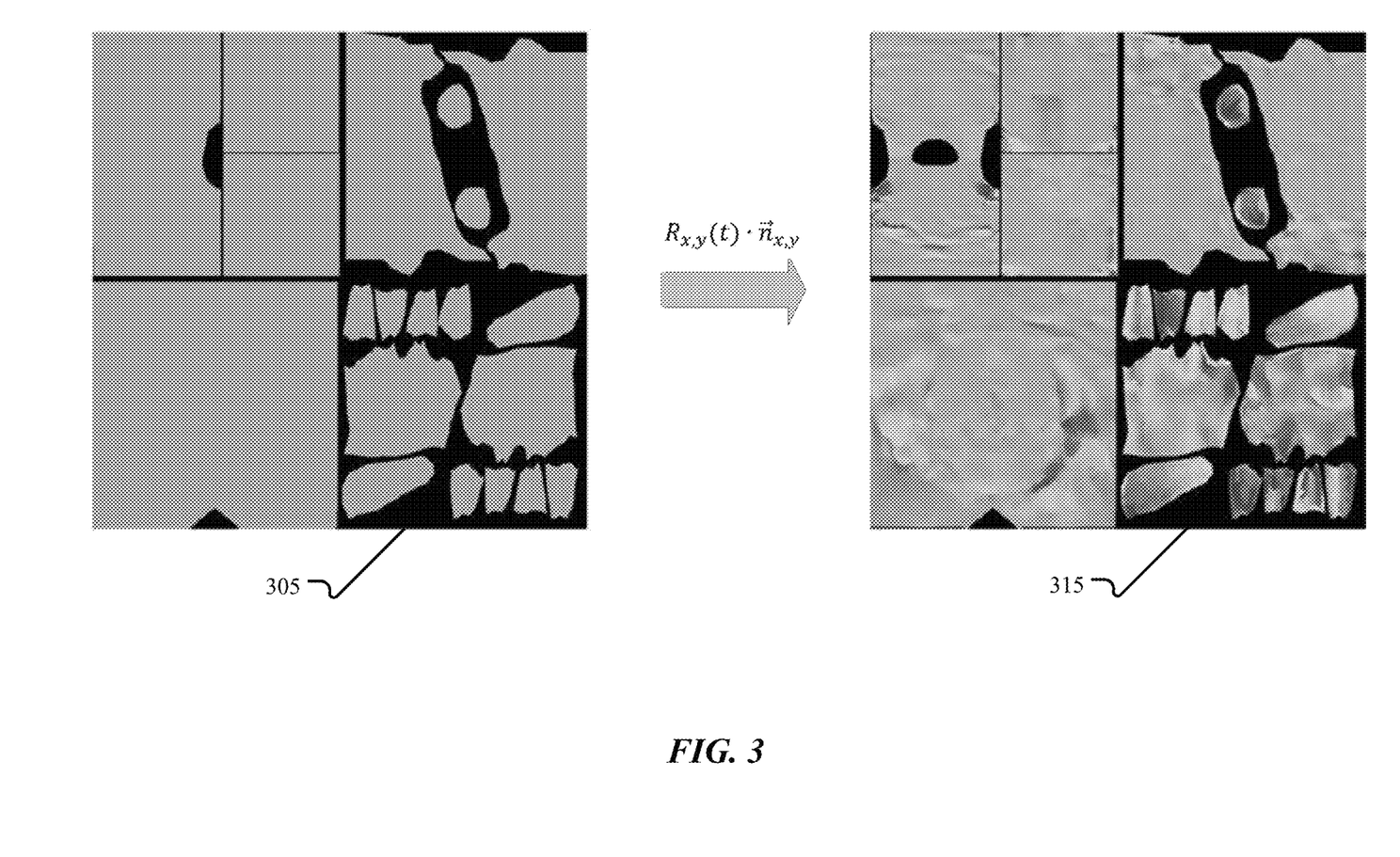
FIG. 3 illustrates an example update of a normal map.

In particular embodiments, the computing device 101 may update the normal map, for each frame of the stream of image data, using the first normal map. FIG. 3 illustrates an example update of a normal map. A previous normal map 305 for the previous frame may be updated into an updated normal map 315 based on the generated normal data, which is generated based on the image data and the depth data corresponding to the frame and the prior fused data. Updating the normal map may comprise minimizing an energy function of a data term and a smooth term using gradient descent. The data term may measure differences between a normal on the normal map and an observed normal in the current image data for the frame. The data term may be represented as $$I(R_{x,y}(t) \cdot \vec{n}) \cdot \vec{n}_{observe} - 1|_2^2$$

where $\vec{n}_{observe}$ may represent observed normal, $R_{x,y}(t)$ may represent a three-dimensional matrix applied to the normal at position (x, y) at time t, and $(R_{x,y}(t) \cdot \vec{n})$ may represent current normal estimated at time t. The smooth term may be for ensuring consistency between neighboring pixels. The smooth term may be represented as:

$$|(R_{x,y}(t) \cdot \vec{n}) - (R_{neighbor}(t) \cdot \vec{n})|_2^2$$

Although this disclosure describes updating a normal map using a generated normal data in a particular manner, this disclosure contemplates updating a normal map using a generated normal data in any suitable manner.

Figure 4:
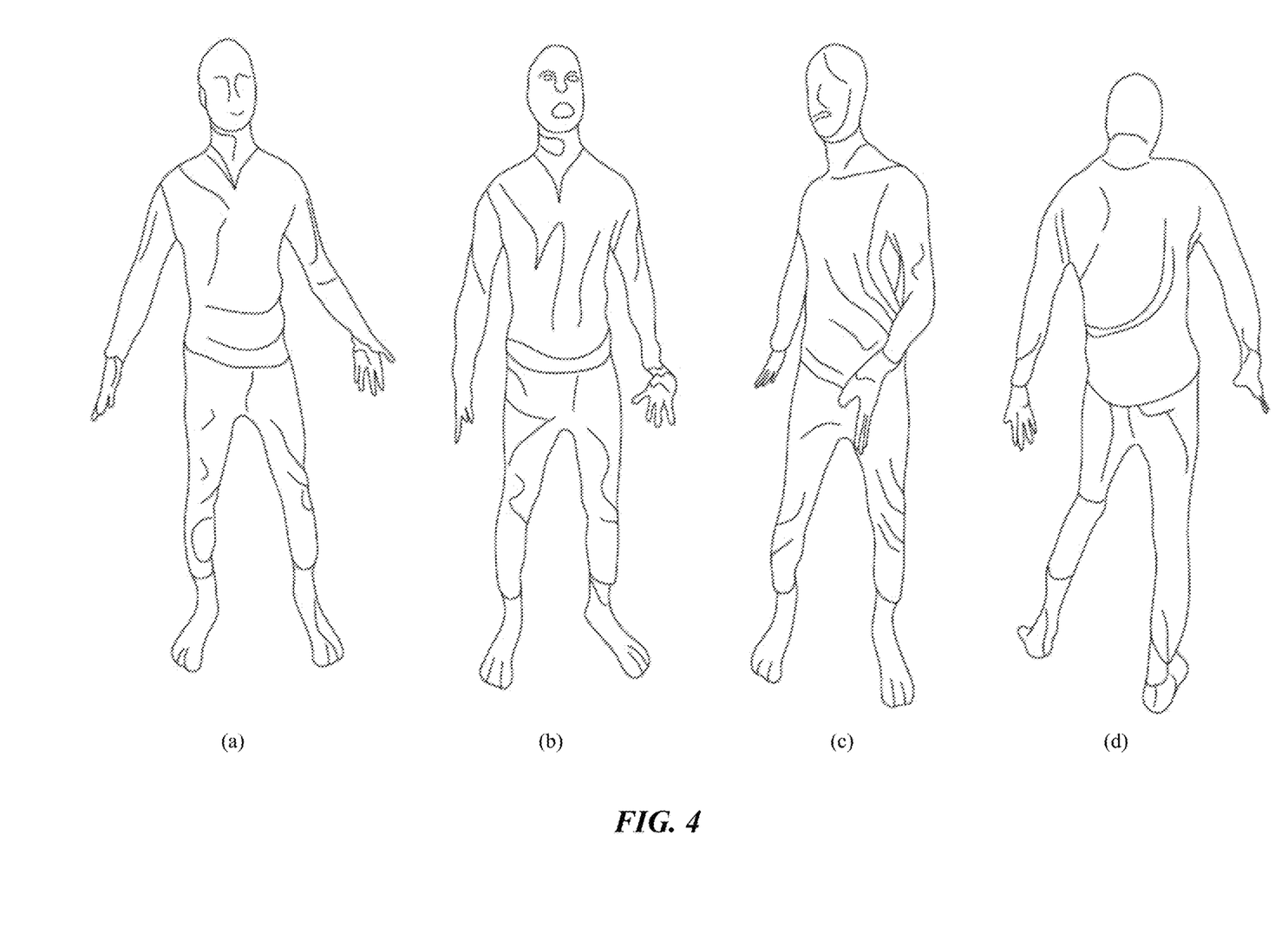
FIG. 4 illustrates example re-rendering of a three-dimensional shape of a target object using an updated normal map.

In particular embodiments, the computing device 101 may re-render the three-dimensional shape of the target object 115 based on the updated normal map for each frame of the stream of image data. Re-rendering three-dimensional shape of the target object 115 may comprise rendering a surface of the reconstructed three-dimensional shape of the target object 115 based on the updated normal map 315. As an example and not by way of limitation, continuing with a prior example, the computing device 101 may re-render the three-dimensional shape of the body of the moving person 115 for each frame of the stream of image data. The computing device 101 may render the surface of the three-dimensional shape of the human body 115 based on the updated normal map 315 for the frame. FIG. 4 illustrates example re-rendering of a three-dimensional shape of a target object using an updated normal map. Figures (a), (b), (c) and (d) in FIG. 4 depict three-dimensional shapes of a body of a person who is rotating around a point after being re-rendered using an updated normal map 315. The details of the objects including wrinkles of the clothes and outlines of the facial objects may be rendered correctly. Reconstructions of the target object with the updated normal map may result in higher resolution output compared to the SDF fusion based reconstructions. The reconstructions with SDF fusion may be limited by the resolution of the SDF volume. Re-rendering the three-dimensional shape using normal maps may allow accumulating information up-to the resolution of the normal map. Although this disclosure describes re-rendering a three-dimensional shape of a target object based on the updated normal map in a particular manner, this disclosure contemplates re-rendering a three-dimensional shape of a target object based on the updated normal map in any suitable manner.

Figure 5:
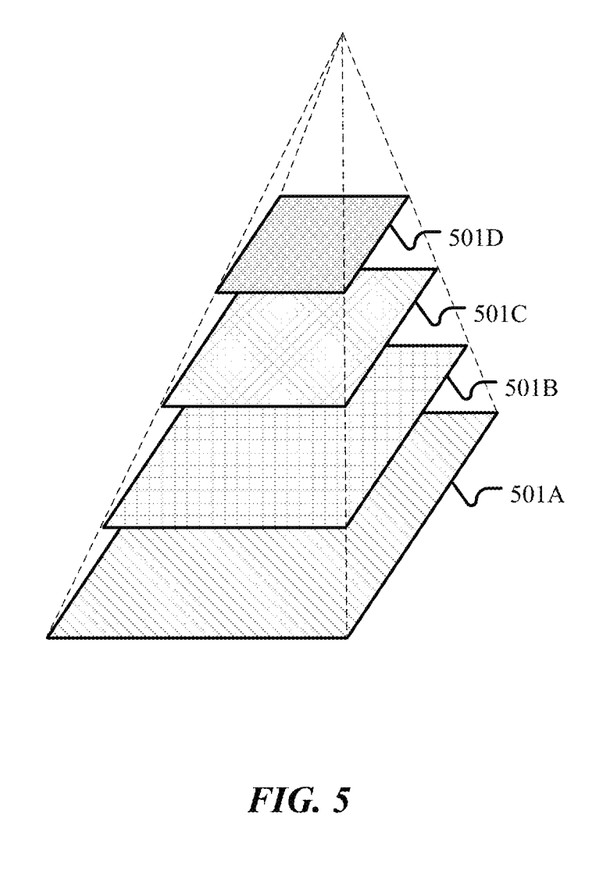
FIG. 5 illustrates example normal maps of a plurality of resolutions.

In particular embodiments, the computing device 101 may detect the target object 115 moves from a first distance to a second distance from the RGB-D camera 103. The second distance may not correspond to a finest resolution among the plurality of resolutions. When the target object 115 is far from the RGB-D camera 103, a resolution of the target object 115 in the normal map may not be high enough for the computing device 101 to render the details of the target object 115. To handle such scenarios, the computing device 101 may maintain a plurality of normal maps of a plurality of resolutions. Each resolution may correspond to a distance between the target object 115 and the RGB-D camera 103. The computing device 101 may determine a first resolution for the normal map corresponding to the second distance of the target object 115. FIG. 5 illustrates example normal maps of a plurality of resolutions. As an example and not by way of limitation, illustrated in FIG. 5, the computing device 101 may maintain 4 normal maps of different resolutions for the target object 115. The normal map 501A may correspond to a closest distance between the target object 115 and the RGB-D camera 103. Thus, the normal map 501A may have highest resolution among the normal maps 501A, 501B, 501C, and 501D that are maintained by the computing device 101. In the example illustrated in FIG. 5, the target object 115 is a human body. The person has moves from a first point to a second point. The first point is at a first distance from the RGB-D camera 103, where the first distance corresponds to the normal map 501B. The second point is at a second distance from the RGB-D camera 103, where the second distance corresponds to the normal map 501C. The computing device 101 may detect that the person has moved from the first point at the first distance to the second point at the second distance. The computing device 101 may determine that the normal map 501C corresponds to the second distance. Although this disclosure describes determining one of a plurality normal maps of a plurality of resolutions based on a distance of the target object from the RGB-D camera in a particular manner, this disclosure contemplates determining one of a plurality normal maps of a plurality of resolutions based on a distance of the target object from the RGB-D camera in any suitable manner.

In particular embodiments, for each frame of the image data stream, the computing device 101 may generate a second normal data associated with the target object 115 using the image data and the depth data. The computing device 101 may update the first resolution normal map using the generated second normal data. The computing device 101 may project the update on the first level normal map to other normal maps among the plurality of normal maps. In particular embodiments, the other normal maps may be normal maps of finer resolutions than the first level normal map. As an example and not by way of limitation, continuing with a prior example, the computing device may generate a normal data associated with the target object 115 for each frame of the image data stream based on the image data and the depth data. The computing device 101 may update the normal map 501C for each frame of the image data stream based on the generated normal data. The computing device 101 may project the update on the normal map 501C to the other normal maps 501A, 501B and 501D. In particular embodiments, the computing device 101 may project the update on the normal map 501C to only normal maps of finer resolutions 501A and 501B than the normal nap 501C. Although this disclosure describes projecting update of a first resolution normal map to other normal maps that the computing device maintains in a particular manner, this disclosure contemplates projecting update of a first resolution normal map to other normal maps that the computing device maintains in any suitable manner.

In particular embodiments, for each frame of the image data stream, the computing device 101 may re-render the surface of the three-dimensional shape of the target object 115 using a second resolution normal map that is a finest resolution normal map among the plurality of normal maps. As an example and not by way of limitation, continuing with a prior example, the computing device 101 may re-render the three-dimensional shape of the person using the normal map 501A that has highest resolution among the plurality of normal maps that the computing device 101 maintains. Rendering the surface of three-dimensional shape of the target object 115 using the highest resolution normal map even when the target object 115 is far from the RGB-D camera 103 may allow the computing device 101 to render details of the target object 115. Although this disclosure describes rendering the surface of the target object using a highest resolution normal map in a particular manner, this disclosure contemplates rendering the surface of the target object using a highest resolution normal map in any suitable manner.

In particular embodiments, the computing device 101 may render an avatar of the target object 115 based on the reconstruction of the target object 115. The computing device 101 may perform visibility tests using a mesh representation of the avatar. During the visibility tests, the computing device 101 may cast a ray from a pixel to see where it intersects with the coarse mesh representation. The visibility test may determine what is visible to the pixel. Based on the visibility tests, the computing device 101 may sample corresponding locations in the normal map to compute the appropriate color for each pixel. The recorded normal map when the target object 115 is in the animated position may be used for rendering the surface of the animated avatar when the avatar is animated. As an example and not by way of limitation, continuing with a prior example, the computing device 101 may create an avatar of the person. When the computing device 101 animates the avatar, the computing device 101 may use recorded normal map 501A when the person was in the animated position to render the surface of the avatar. Although this disclosure describes rendering the surface of an avatar using the recorded normal map in a particular manner, this disclosure contemplates rendering the surface of an avatar using the recorded normal map in any suitable manner.

Figure 6:
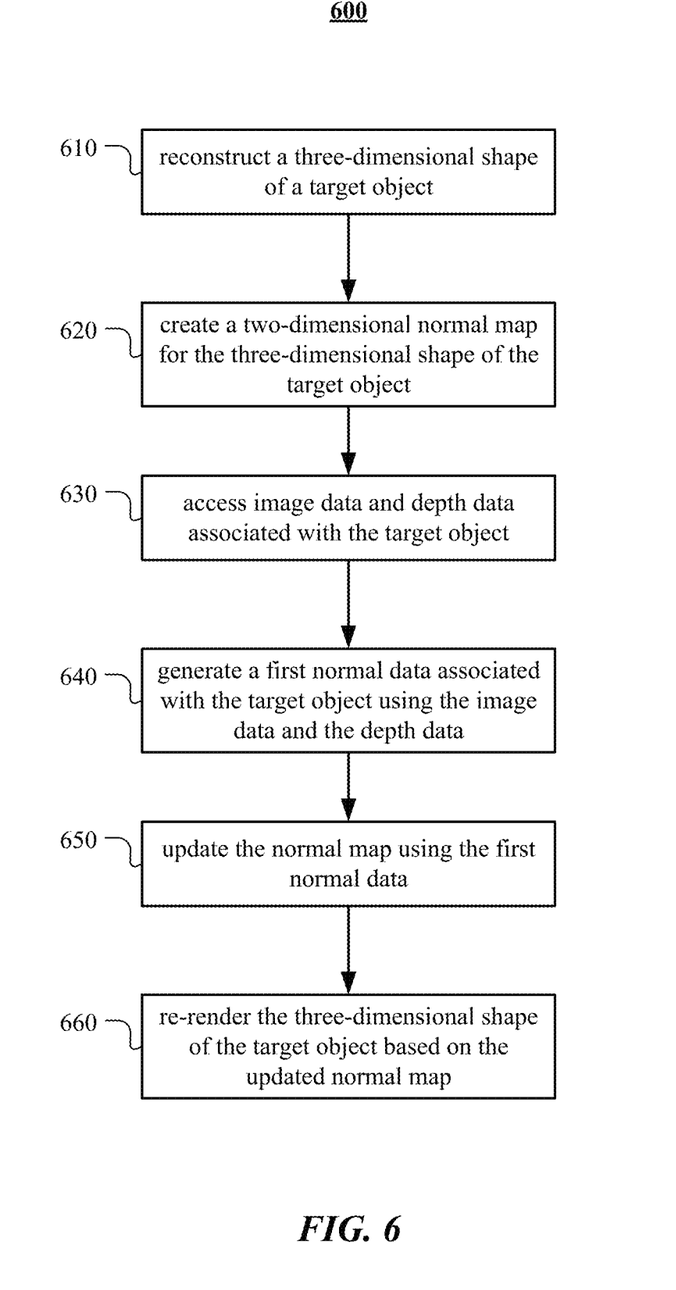
FIG. 6 illustrates an example method for reconstructing a three-dimensional shape of a target object using a normal map.

FIG. 6 illustrates an example method 600 for reconstructing a three-dimensional shape of a target object using a normal map. The method may begin at step 610, where a computing device may reconstruct a three-dimensional shape of a target object. At step 620, the computing device may create a two-dimensional normal map for the three-dimensional shape of the target object. At step 630, the computing device may access image data and depth data associated with the target object. At step 640, the computing device may generate a first normal data associated with the target object using the image data and the depth data. At step 650, the computing device may update the normal map using the first normal data. At step 660, the computing device may re-render the three-dimensional shape of the target object based on the updated normal map. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for reconstructing a three-dimensional shape of a target object using a normal map including the particular steps of the method of FIG. 6, this disclosure contemplates any suitable method for reconstructing a three-dimensional shape of a target object using a normal map including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
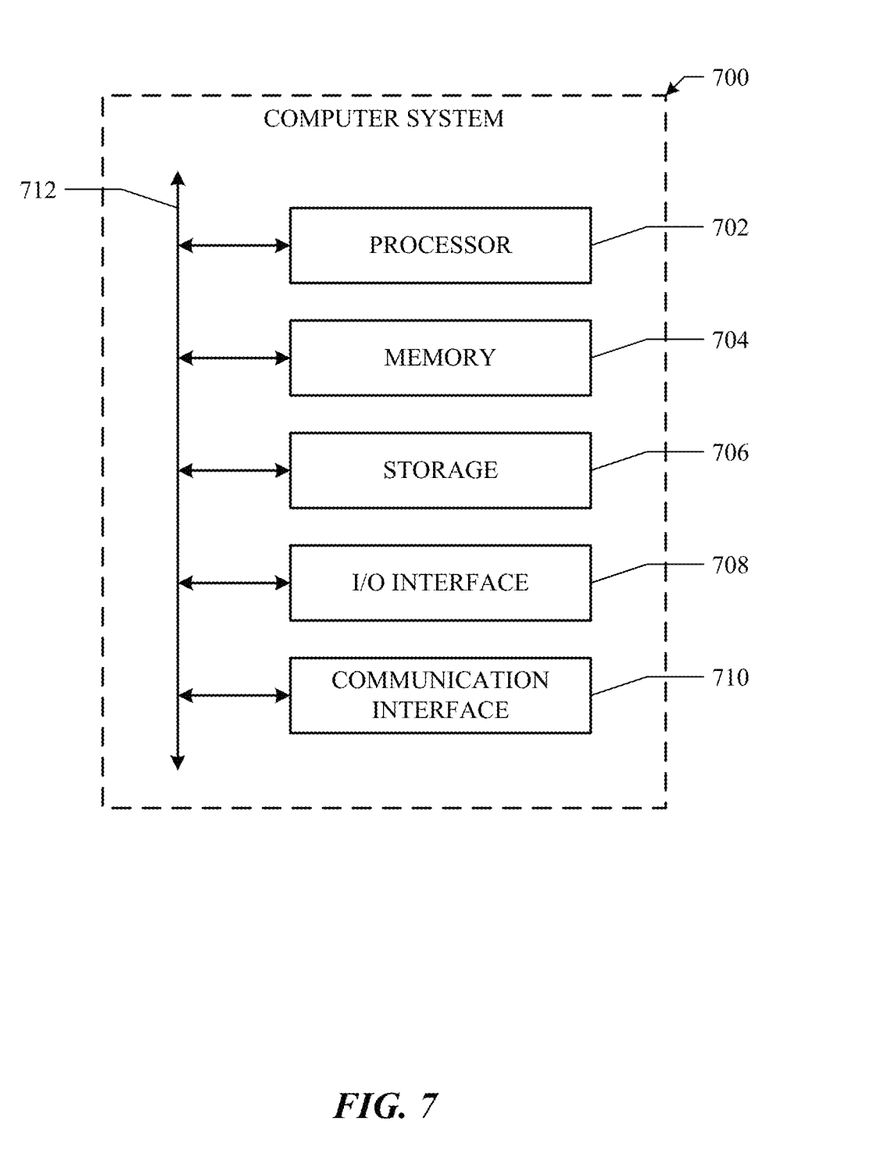
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
    reconstructing a three-dimensional shape of a target object that is moving when captured in a stream of image and depth data;
    creating a first two-dimensional normal map for the three-dimensional shape of the target object based on data corresponding to one or more frames, wherein the first two-dimensional normal map comprises first pixel elements that correspond to surface locations on the target object, and each of the first pixel elements specifying a first surface normal at the corresponding surface location;
    rendering a first output image based on the three-dimensional shape of the target object and the first two-dimensional normal map;
    accessing image and depth data associated with the target object corresponding to a first frame after the one or more frames;
    generating a first normal data associated with the target object using the image and depth data corresponding to the first frame;
    creating a second two-dimensional normal map for the three-dimensional shape of the target object based on the first normal data and the first surface normals corresponding to the first pixel elements in the first two-dimensional normal map created based on the data corresponding to the one or more frames preceding the first frame, wherein the second two-dimensional normal map comprises second pixel elements that correspond to the surface locations on the target object, and each of the second pixel elements specifying a second surface normal at the corresponding surface location; and
    rendering a second output image based on the three-dimensional shape of the target object and the second two-dimensional normal map.

2. The method of claim 1, wherein reconstructing the three-dimensional shape of the target object comprises performing a Non-rigid Signed Distance Function (SDF) fusion of a stream of image data for the target object.

3. The method of claim 1, wherein creating the second two-dimensional normal map comprises minimizing an energy function of a data term and a smooth term using gradient descent.

4. The method of claim 3, wherein the data term measures differences between a normal on the first two-dimensional normal map and an observed normal in the first normal data generated using the image and depth data corresponding to the first frame.

5. The method of claim 3, wherein the smooth term is for ensuring consistency between neighboring pixels.

6. The method of claim 1, wherein rendering the second output image comprises rendering a surface of the reconstructed three-dimensional shape of the target object based on the second two-dimensional normal map.

7. The method of claim 1, wherein the target object is a human body.

8. The method of claim 1, further comprising rendering an avatar of the target object based on the reconstruction of the target object.

9. The method of claim 8, wherein, when the avatar is animated to a position, the recorded normal map when the target object is in the animated position is used for rendering a surface of the animated avatar.

10. The method of claim 1, further comprising:
maintaining a plurality of normal maps of a plurality of resolutions, each resolution corresponding to a distance between the target object and a camera capturing the image and depth data associated with the target object;
detecting the target object moves from a first distance to a second distance from the camera, wherein the second distance does not correspond to a finest resolution among the plurality of resolutions; and
determining a first resolution for the normal map corresponding to the second distance of the target object.

11. The method of claim 10, wherein creating the second two-dimensional normal map comprises:
generating a second normal data associated with the target object using the image and depth data corresponding to a second frame;
creating a two-dimensional normal map of the first resolution corresponding to the second distance of the target object based on the second normal data and surface normals corresponding to pixel elements in a maintained two-dimensional normal map of the first resolution corresponding to the second distance of the target object; and
projecting content of the created two-dimensional normal map of the first resolution to other normal maps among the plurality of normal maps.

12. The method of claim 11, wherein the other normal maps comprise normal maps of finer resolutions than the first resolution.

13. The method of claim 10, wherein rendering the second output image comprises rendering a surface of the reconstructed three-dimensional shape based on a second resolution normal map that is a finest resolution normal map among the plurality of normal maps.

14. One or more computer-readable non-transitory storage media embodying software that is operable when executed to:
reconstruct a three-dimensional shape of a target object that is moving when captured in a stream of image and depth data;
create a first two-dimensional normal map for the three-dimensional shape of the target object based on data corresponding to one or more frames, wherein the first two-dimensional normal map comprises first pixel elements that correspond to surface locations on the target object, and each of the first pixel elements specifying a first surface normal at the corresponding surface location;
render a first output image based on the three-dimensional shape of the target object and the first two-dimensional normal map;
access image and depth data associated with the target object corresponding to a first frame after the one or more frames;
generate a first normal data associated with the target object using the image and depth data corresponding to the first frame;
create a second two-dimensional normal map for the three-dimensional shape of the target object based on the first normal data and the first surface normals corresponding to the first pixel elements in the first two-dimensional normal map created based on the data corresponding to the one or more frames preceding the first frame, wherein the second two-dimensional normal map comprises second pixel elements that correspond to the surface locations on the target object, and each of the second pixel elements specifying a second surface normal at the corresponding surface location; and
render a second output image based on the three-dimensional shape of the target object and the second two-dimensional normal map.

15. The computer-readable non-transitory storage media of claim 14, wherein reconstructing the three-dimensional shape of the target object comprises performing a Non-rigid Signed Distance Function (SDF) fusion of a stream of image data for the target object.

16. The computer-readable non-transitory storage media of claim 14, wherein creating the second two-dimensional normal map comprises minimizing an energy function of a data term and a smooth term using gradient descent.

17. The computer-readable non-transitory storage media of claim 16, wherein the data term measures differences between a normal on the first two-dimensional normal map and an observed normal in the first normal data generated using the image and depth data corresponding to the first frame.

18. The computer-readable non-transitory storage media of claim 16, wherein the smooth term is for ensuring consistency between neighboring pixels.

19. The computer-readable non-transitory storage media of claim 14, wherein rendering the second output image comprises rendering a surface of the reconstructed three-dimensional shape of the target object based on the second two-dimensional normal map.

20. A system comprising:
one or more processors; and
one or more computer-readable non-transitory storage media coupled to one or more of the processors and comprising instructions operable when executed by one or more of the processors to cause the system to:
reconstruct a three-dimensional shape of a target object that is moving when captured in a stream of image and depth data;
create a first two-dimensional normal map for the three-dimensional shape of the target object based on data corresponding to one or more frames, wherein the first two-dimensional normal map comprises first pixel elements that correspond to surface locations on the target object, and each of the first pixel elements specifying a first surface normal at the corresponding surface location;
render a first output image based on the three-dimensional shape of the target object and the first two-dimensional normal map;
access image and depth data associated with the target object corresponding to a first frame after the one or more frames;
generate a first normal data associated with the target object using the image and depth data corresponding to the first frame;
create a second two-dimensional normal map for the three-dimensional shape of the target object based on the first normal data and the first surface normals corresponding to the first pixel elements in the first two-dimensional normal map created based on the data corresponding to the one or more frames preceding the first frame, wherein the second two-dimensional normal map comprises second pixel elements that correspond to the surface locations on the target object, and each of the second pixel elements specifying a second surface normal at the corresponding surface location; and render a second output image based on the three-dimensional shape of the target object and the second two-dimensional normal map.

\* \* \* \* \*